Sept. 1, 1964   J. ENGALITCHEFF, JR   3,146,609
WATER DISTRIBUTION SYSTEM
Filed April 27, 1964   2 Sheets-Sheet 1

INVENTOR
John Engalitcheff Jr.

BY Stevens, Davis, Miller + Mosher
ATTORNEY

Sept. 1, 1964   J. ENGALITCHEFF, JR   3,146,609
WATER DISTRIBUTION SYSTEM
Filed April 27, 1964   2 Sheets-Sheet 2

INVENTOR
John Engalitcheff Jr.

BY Stevens, Davis, Miller & Mosher
ATTORNEY 3,146,609
WATER DISTRIBUTION SYSTEM
John Engalitcheff, Jr., Gibson Island, Md., assignor to Baltimore Aircoil Company, Inc., Baltimore, Md., a corporation of Maryland
Filed Apr. 27, 1964, Ser. No. 362,766
7 Claims. (Cl. 62—305)

This invention relates to evaporative heat exchangers and in particular to improved apparatus for the distribution of water over a heat exchange surface.

In the art of evaporative heat exchangers the usual practice is to spray water which flows by gravity in droplet or rain-like form countercurrent to air which flows upwardly through the heat exchange area. During this period of contact, some of the water evaporates and the heat of vaporization is extracted from whatever is to be cooled. Such systems are commonly used to cool fluids, to condense and cool refrigerants, to cool water etc. In the cooling of water some of the water is evaporated and the heat of vaporization is extracted from the remaining water which is thus cooled.

In a countercurrent system it is necessary that the equipment which sprays water across the top of the heat exchanger be so constructed that air can pass through and around it. To this end it has been common to make a grid of pipes above the heat exchanger and to provide these with nozzles from which the water is sprayed. While this arrangement works satisfactorily it is expensive to construct and to maintain. Individual nozzles have to be used and the pipe has to be installed to reasonably high standards. A pump capable of developing enough head to deal with the resistance imposed by the nozzles is, of course, required.

In an attempt to eliminate the use of pipes and spray nozzles to supply droplets of water to evaporative heat exchangers, there has been developed a system of troughs which can be filled to a predetermined level and which will spill water through notches in such fashion as to produce a rain-like condition over the area of the heat exchanger. Such a system as this is disclosed in copending application S.N. 240,199 filed October 17, 1962. However, the apparatus of that patent application requires an overhead water supply to the troughs which is of such construction as to prevent the flow of air countercurrent to the water. Accordingly that system is employed with a transverse air flow.

It is an object of the present invention to improve upon the system of application S.N. 240,199 by providing a trough water distribution system which is so constructed and arranged as to permit the water and air to flow in countercurrent relationship and thus achieve all of the advantages of a pipe and spray nozzle system with none of its disadvantages.

Other objects and advantages of this invention will be apparent upon consideration of the following detailed description of a preferred embodiment thereof in conjunction with the annexed drawings wherein.

Figure 1:
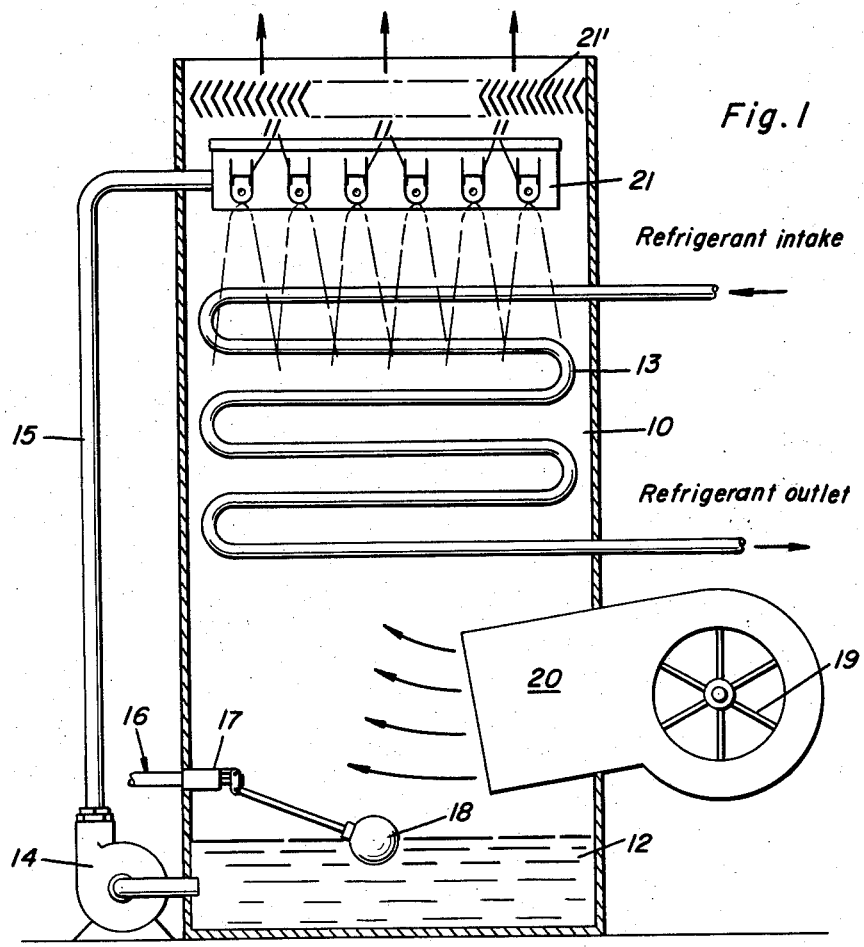
FIGURE 1 is a vertical sectional view taken through a typical evaporative heat exchanger utilizing the water distribution system of the present invention.

Referring now to the drawings in greater detail, it will be noted that a chamber 10 is provided at its upper end with a group of troughs 11 and at its lower end with a sump 12. Each trough has V notches 11a in its side walls, those in one side wall being staggered in relation to those of the other side wall. Water spilling from notches 11a in the trough 11 passes over heat exchanger tubes 13 in the form of rain or droplets and is collected in the sump 12 from which it is re-circulated by a pump 14 and a conduit 15 back to the troughs 11. Make-up water enters through a conduit 16 when a valve 17 is opened by reason of lowering of the float 18. A centrifugal fan 19 pumps air through ducting 20 and this air flows upwardly through the chamber 10 countercurrent to the water issuing from the troughs 11. The air, after passage through the heat exchanger, passes in between the troughs 11 and through mist eliminators $21^1$ to atmosphere. The mist eliminators $21^1$ are in the form of baffles covering the cross section of the upper end of the chamber 10. If a fluid to be cooled is circulated through the heat exchanger tubes 13, heat is extracted from it by vaporization of some of the water spilling from the notches in the troughs 11.

The foregoing is a brief description of an evaporative heat exchanger which is conventional in structure and operation except for the water distribution system comprised of the troughs 11.

The invention relates specifically to an improved apparatus for the distribution of the water over the heat exchange surface utilizing the distribution box and trough arrangement shown best in FIGS. 2–5. For the sake of clarity, only one trough 11 is specifically referred to in FIGS. 2 and 4, although it is to be understood that the description applies equally to all the troughs 11. In the improvement, water is fed through conduit 15 into a distribution box 21 at the desired flow rate. While box 21 may be covered it is open to atmosphere. An orifice 22 is provided in the wall of the box 21 registering with each trough 11 in order to distribute evenly and to meter the proper flow to each trough. A horizontal baffle 23 is provided in each trough 11 to separate the bottom 11b of the trough from its notched upper portion 11a. Water enters the trough 11 through orifice 22 at a point between the horizontal baffle 23 and the bottom of the trough 11b. See FIG. 2. The baffle 23 extends the full length of the trough 11 and is provided with spaced orifices 24 along its entire length. These orifices 24 provide an even water distribution to the upper part of the trough. The water then flows over the notched portion 11a of the trough on to the heat exchanger section 13. The end of each trough 11 opposite to the distribution box 21 is provided with a vertical end plate 25 as high as the top of the side walls of the trough.

It has been found that for optimum distribution the total area of holes 24 in each baffle 23 should be roughly equal to one half the cross sectional area of the respective trough 11 below the baffle 23.

Figure 5:
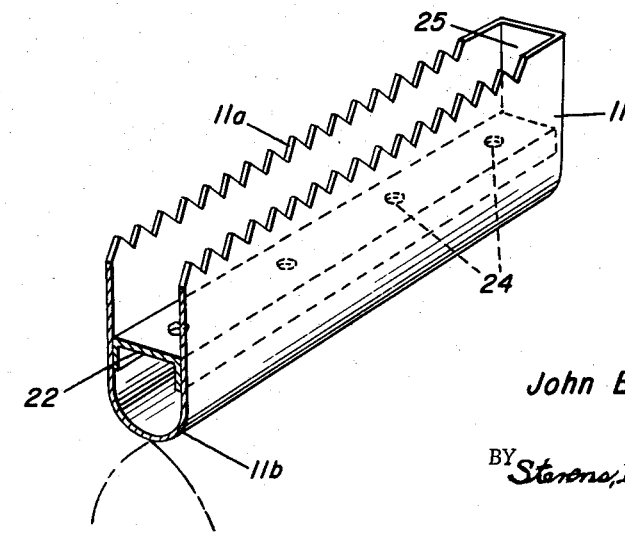
FIGURE 5 is an isometric view of a fragment of a typical trough partially cut away.
Figure 2:
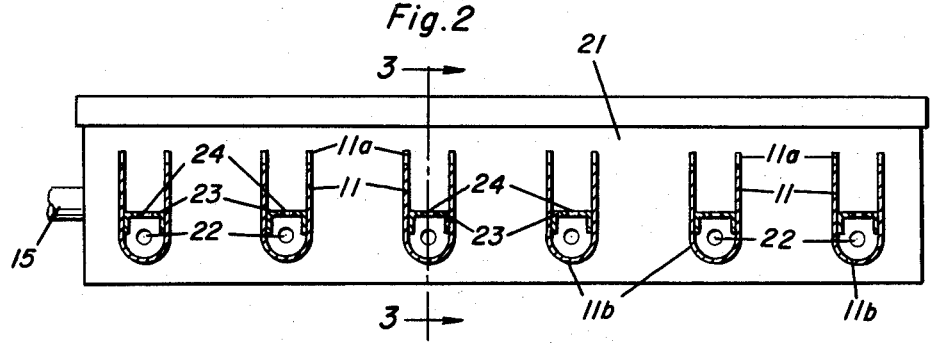
FIGURE 2 is a view of the water distribution system similar to that shown in FIG. 1 with the troughs again shown in transverse section but to an enlarged scale.
Figure 3:
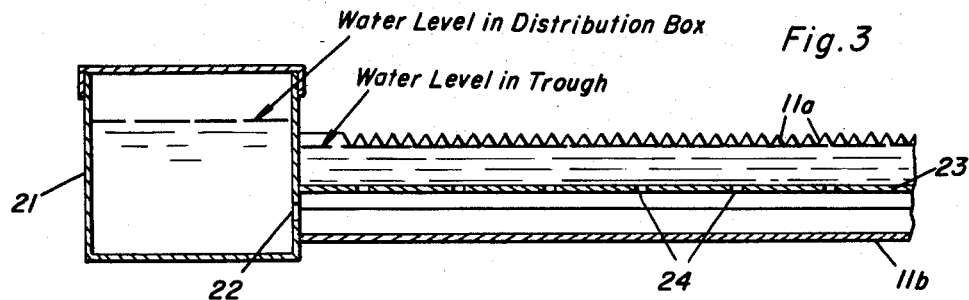
FIGURE 3 is a sectional view taken along line 3—3 of FIG. 2.
Figure 4:
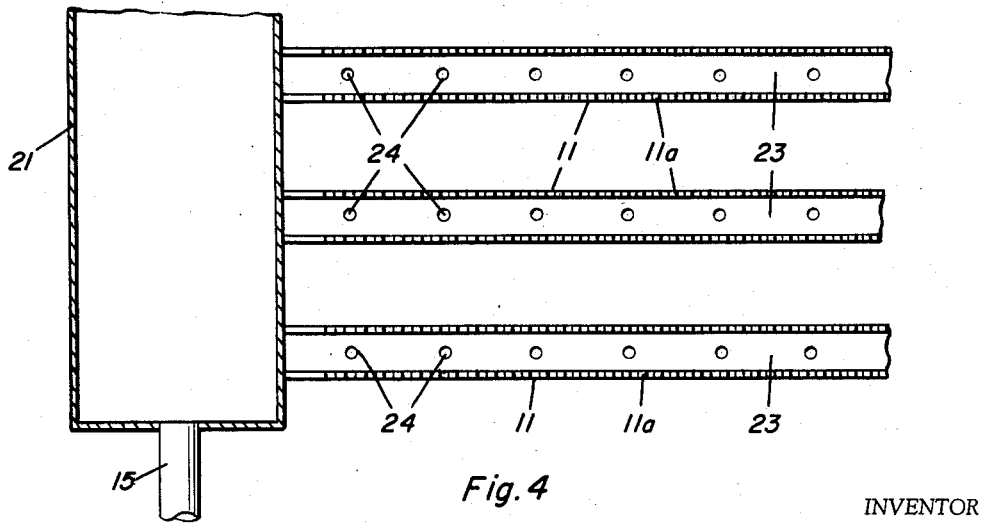
FIGURE 4 is a fragmentary top plan view of the water distribution system shown in FIG. 3 with parts in section.

An advantage of the present invention resides in the curvature of the bottom of the trough. The streams of water issuing from each notch 11a cross the longitudinal center line of the bottom of the trough 11 as shown in FIGS. 1 and 5. Thus, the streams from the opposite sides of the trough fall in divergent relationship, see FIG. 1, and the magnitude of this divergence is controlled by the degree of curvature of the bottom of the trough and the velocity of the air passing upwardly between the troughs. This control of stream location makes it possible to design a very precise and even distribution of water over a particular area. The feeding of water from the ends of the troughs 11 by the system of the present invention results in a very steady head of water in each trough throughout the length thereof even when that length is quite substantial.

In addition to having the advantage of feeding the troughs from one end while providing even water distribution, there is the further advantage that this manner of feeding the troughs allows its usage with counterflow heat exchangers because the troughs 11 are arranged in parallel spaced relation and the air can pass out between them. Also, the individual trough lengths can be lengthened considerably without any substantial variation of the other structure.

While the invention has been described in conjunction with an evaporative condenser, it is to be understood that it is equally applicable to the cooling towers or indeed to any cooling of fluids by evaporative heat exchange.

What is claimed is:

1. In an evaporative heat exchanger including a heat exchange region and means to pass air upwardly through said region, the improvement that comprises a plurality of generally U section troughs arranged in spaced relation above said region, each trough having V notches in a side wall, means to flow water into said troughs in a direction generally parallel to the longitudinal axis thereof, and means within each trough to maintain a constant level of water throughout its length whereby the flow from all the notches will be substantially equal.

2. In an evaporative heat exchanger including a heat exchange region and means to pass air upwardly through said region, the improvement that comprises a plurality of generally U section troughs arranged in spaced relation above said region, each trough having V notches in a side wall, means to supply equal volumes of water to one end only of each of said troughs, and means within each trough to maintain a constant level of water throughout its length whereby the flow from all the notches will be substantially equal.

3. In an evaporative heat exchanger including a heat exchange region and means to pass air upwardly through said region, the improvement that comprises a plurality of generally U section troughs arranged in spaced relation above said region, each trough having V notches in a side wall, a distribution box having orifices therein each communicating with a trough, means to maintain a predetermined head of water in said box, and means within each trough to maintain a constant level of water throughout its length whereby the flow from all the notches will be substantially equal.

4. In an evaporative heat exchanger including a heat exchange region and means to pass air upwardly through said region, the improvement that comprises a plurality of generally U section troughs arranged in spaced relation above said region, each trough having V notches in a side wall, a horizontal baffle separating the bottoms of each of said troughs from the notched regions thereof, said baffle having apertures therethrough at spaced intervals to equalize the distribution of water lengthwise of said troughs, a distribution box having orifices therein each communicating with a trough, means to maintain a predetermined head of water in said box, and means within each trough to maintain a constant level of water throughout its length whereby the flow from all the notches will be substantially equal.

5. In an evaporative heat exchanger including a heat exchange region and means to pass air upwardly through said region, the improvement that comprises a plurality of generally U section troughs arranged in spaced relation above said region, each trough having V notches in a side wall, a distribution box having orifices therein each communicating with a trough at one end only of said trough, means to maintain a predetermined head of water in said box, and means within each trough to maintain a constant level of water throughout its length whereby the flow from all the notches will be substantially equal.

6. In an evaporative heat exchanger including a heat exchange region and means to pass air upwardly through said region, the improvement that comprises a plurality of generally U section troughs arranged in spaced relation above said region, each trough having V notches in a side wall, a horizontal baffle separating the bottom of each trough from the notched region thereof, means to supply equal volumes of water under said baffles, said baffle having apertures therethrough at spaced intervals to equalize the distribution of water lengthwise of said trough, a distribution box having orifices therein each communicating with a trough, means to maintain a predetermined head of water in said box, and means within each trough to maintain a constant level of water throughout its length whereby the flow from all the notches will be substantially equal.

7. In an evaporative heat exchanger including a heat exchange region and means to pass air upwardly through said region, the improvement that comprises a plurality of generally U section troughs arranged in spaced relation above said region, each trough having V notches in a side wall, the cross sectional area of the trough below the baffle being substantially twice the sum of the areas of the apertures through said baffle, a distribution box having orifices therein each communicating with a trough, means to maintain a predetermined head of water in said box, and means within each trough to maintain a constant level of water throughout its length whereby the flow from all the notches will be substantially equal.

References Cited in the file of this patent

UNITED STATES PATENTS

| | | |
|---|---|---|
| 808,050 | Hauswirth | Dec. 19, 1905 |
| 1,287,630 | Burhorn | Dec. 17, 1918 |
| 1,602,844 | Burhorn | Oct. 12, 1926 |
| 1,825,453 | Harry | Sept. 29, 1931 |

UNITED STATES PATENT OFFICE
CERTIFICATE OF CORRECTION

Patent No. 3,146,609 September 1, 1964

John Engalitcheff, Jr.

It is hereby certified that error appears in the above numbered patent requiring correction and that the said Letters Patent should read as corrected below.

Column 4, lines 4, 31 and 44, strike out "means", each occurrence, and insert instead -- said horizontal baffle --; lines 4, 32 and 45, after "trough", each occurrence, insert -- serving --; same column 4, line 40, after "wall," insert -- a horizontal baffle separating the bottom of each trough from the notched region thereof, said baffle having apertures therethrough, --.

Signed and sealed this 23rd day of February 1965.

(SEAL)
Attest:

ERNEST W. SWIDER
Attesting Officer

EDWARD J. BRENNER
Commissioner of Patents